United States Patent [19]
Marra et al.

[11] Patent Number: 5,341,364
[45] Date of Patent: Aug. 23, 1994

[54] DISTRIBUTED SWITCHING IN BIDIRECTIONAL MULTIPLEX SECTION-SWITCHED RINGTRANSMISSION SYSTEMS

[75] Inventors: William C. Marra, Bricktown; Darius D. Slavinskas, North Middletown; Mark J. Soulliere, Manasquan, all of N.J.

[73] Assignee: AT&T Bell Laboratories, Murray Hill, N.J.

[21] Appl. No.: 892,079

[22] Filed: Jun. 2, 1992

[51] Int. Cl.⁵ ............................................. H04J 1/16
[52] U.S. Cl. .................................... 370/16.1; 370/16
[58] Field of Search ............. 370/15, 16, 16.1, 85.12, 370/86.14, 85.15, 94.1, 60; 340/825.01, 827, 825.05, 825.06; 371/8.1, 11.1, 20.5, 20.6

[56] References Cited

U.S. PATENT DOCUMENTS

| | | | |
|---|---|---|---|
| 4,538,264 | 2/1983 | Bahr et al. | 371/8 |
| 4,539,655 | 9/1985 | Trussell et al. | 370/16.1 |
| 4,835,763 | 2/1988 | Lau | 370/16 |
| 5,105,188 | 4/1992 | Jung et al. | 370/16.1 |
| 5,179,548 | 1/1993 | Sandesara | 370/16.1 |
| 5,187,706 | 2/1993 | Frankel et al. | 370/16.1 |
| 5,218,604 | 6/1993 | Sosnosky | 370/16.1 |

OTHER PUBLICATIONS

"SONET Line Protection Switched Ring APS Protocol", T1X1.5/91-026, J. Baroni et al., AT&T Network Systems.

"SONET Ring Applications for Survivable Fiber Loop Networks", *IEEE Communications Magazine*, Jun. 1991, J. Sosnosky et al., pp. 51–58.

"Further Considerations on 2-Fiber Bidirectional Line Switched OC–48 Rings", Contribution to T1 Standards Project-T1X1.5/91-019, G. Copley et al.

Synchronous Optical Network (SONET): Automatic Protection Switching, Draft ANSI T1X1.5/92-004R2.

*Primary Examiner*—Douglas W. Olms
*Assistant Examiner*—Dang Ton
*Attorney, Agent, or Firm*—Thomas Stafford

[57] ABSTRACT

Long delays in bidirectional multiplex section-switched self-healing ring transmission systems are avoided by eliminating looping of communications signals when restoring them in response to a failure in the ring and by distributing switching of paths to be protected to ring nodes other than those immediately adjacent the failure. This is realized by provisioning each node in the bidirectional multiplex section-switched ring transmission system with a map of its traffic pattern (all active tributaries) and the relative position of each ring node in the ring transmission system, and allowing the ring node, if it has communications traffic affected by the failure, to bridge and switch to and from the protection path.

10 Claims, 9 Drawing Sheets

RING NODE MAP

| NODE ID |
|---------|
| 101 ID  |
| 102 ID  |
| 103 ID  |
| 104 ID  |

FIG. 6

NODE TRAFFIC PATTERN FOR NODE 104

| CW AU-4 # | DESTINATION NODE | CCW AU-4 # | DESTINATION NODE |
|-----------|------------------|------------|------------------|
| a         | 101              | c          | 103              |
| b         | 102              | d          | 102              |
| ⋮         | ⋮                | ⋮          | ⋮                |

FIG. 7

NODE TRAFFIC PATTERN FOR NODE 102

| CW AU-4 # | DESTINATION NODE | CCW AU-4 # | DESTINATION NODE |
|-----------|------------------|------------|------------------|
| a         | 103              | b          | 104              |
| b         | 103              | e          | 101              |
| d         | 104              |            |                  |
| ⋮         | ⋮                | ⋮          | ⋮                |

| | NODE 101 | NODE 102 | NODE 103 | NODE 104 |
|---|---|---|---|---|
| K1(CW) | 00000010 | 00000011 | 00000100 | 00000001 |
| MEANING | IDLE/ DESTINATION ID | IDLE/ DESTINATION ID | IDLE/ DESTINATION ID | IDLE/ DESTINATION ID |
| K1(CCW) | 00000100 | 00000001 | 00000010 | 00000011 |
| MEANING | IDLE/ DESTINATION ID | IDLE/ DESTINATION ID | IDLE/ DESTINATION ID | IDLE/ DESTINATION ID |
| K2(CW) | 00010000 | 00100000 | 00110000 | 00010000 |
| MEANING | SOURCE ID/ SHORT PATH SIGNALING/IDLE | SOURCE ID/ SHORT PATH SIGNALING/IDLE | SOURCE ID/ SHORT PATH SIGNALING/IDLE | SOURCE ID/ SHORT PATH SIGNALING/IDLE |
| K2(CCW) | 00010000 | 00100000 | 00110000 | 01000000 |
| MEANING | SOURCE ID/ SHORT PATH SIGNALING/IDLE | SOURCE ID/ SHORT PATH SIGNALING/IDLE | SOURCE ID/ SHORT PATH SIGNALING/IDLE | SOURCE ID/ SHORT PATH SIGNALING/IDLE |

FIG. 10

| | NODE 101 | NODE 102 | NODE 103 | NODE 104 |
|---|---|---|---|---|
| K1(CW) | 10110100 | 00000011 | 00000100 | 10110001 |
| MEANING | SF-LOOP/DESTINATION NODE | IDLE/DESTINATION NODE | IDLE/DESTINATION NODE | SF-LOOP/DESTINATION NODE |
| K1(CCW) | 10110100 | 00000001 | 00000010 | 10110001 |
| MEANING | SF-LOOP/DESTINATION NODE | IDLE/DESTINATION NODE | IDLE/DESTINATION NODE | SF-LOOP/DESTINATION NODE |
| K2(CW) | 00011000 | 00100000 | 00110000 | 01000110 |
| MEANING | SOURCE ID/LONG PATH SIGNALING/IDLE | SOURCE ID/SHORT PATH SIGNALING/IDLE | SOURCE ID/SHORT PATH SIGNALING/IDLE | SOURCE ID/SHORT PATH SIGNALING/FERF |
| K2(CCW) | 00010110 | 00100000 | 00110000 | 01001000 |
| MEANING | SOURCE ID/SHORT PATH SIGNALING/FERF | SOURCE ID/SHORT PATH SIGNALING/IDLE | SOURCE ID/SHORT PATH SIGNALING/IDLE | SOURCE ID/LONG PATH SIGNALING/IDLE |

FIG. 11

| | NODE 101 | NODE 102 | NODE 103 | NODE 104 |
|---|---|---|---|---|
| K1(CW) | 10110100 | 10110100 | 10110100 | 10110001 |
| MEANING | SF-LOOP/ DESTINATION NODE | K-BYTE EXPRESSED THRU 102 DESTINED FOR 104 | K-BYTE EXPRESSED THRU 103 DESTINED FOR 104 | SF-LOOP/ DESTINATION NODE |
| K1(CCW) | 10110100 | 10110001 | 10110001 | 10110001 |
| MEANING | SF-LOOP/ DESTINATION NODE | K-BYTE EXPRESSED THRU 102 DESTINED FOR 101 | K-BYTE EXPRESSED THRU 103 DESTINED FOR 101 | SF-LOOP/ DESTINATION NODE |
| K2(CW) | 00011000 | 00011000 | 00011000 | 01000110 |
| MEANING | SOURCE ID/ LONG PATH SIGNALING/IDLE | K-BYTE EXPRESSED THRU 102 DESTINED FOR 104 | K-BYTE EXPRESSED THRU 103 DESTINED FOR 104 | SOURCE ID/ SHORT PATH SIGNALING/FERF |
| K2(CCW) | 00010110 | 01001000 | 01001000 | 01001000 |
| MEANING | SOURCE ID/ SHORT PATH SIGNALING/FERF | K-BYTE EXPRESSED THRU 102 DESTINED FOR 101 | K-BYTE EXPRESSED THRU 103 DESTINED FOR 101 | SOURCE ID/ LONG PATH SIGNALING/IDLE |

DISTRIBUTED SWITCHING IN BIDIRECTIONAL MULTIPLEX SECTION-SWITCHED RINGTRANSMISSION SYSTEMS

TECHNICAL FIELD

This invention relates to ring transmission systems and, more particularly, to bidirectional multiplex section-switched ring transmission systems.

BACKGROUND OF THE INVENTION

In prior known bidirectional multiplex section-switched self-healing ring transmission systems, bridging and switching, in the presence of a fault, was restricted to switching ring nodes immediately adjacent to the fault. A problem with such an arrangement, in long distance networks, is that the restoration path is extremely long. The extremely long restoration path is a consequence of the fact that only the ring nodes adjacent to the fault are allowed to bridge, switch and loop the restored traffic. In certain applications, for examples, transoceanic bidirectional multiplex section-switched ring transmission systems, the length of the restoration path would be extremely long, causing long delays and degraded system performance. The extremely long length of the restoration path results from the looping which causes it to traverse the ocean three times for particular fault conditions. It is the looping aspect of the restored path that causes the system impairment. The long delays and degraded service is extremely undesirable.

SUMMARY OF THE INVENTION

The problems resulting from prior bidirectional multiplex section-switched ring transmission system restoration techniques are overcome, in accordance with the principles of the invention, by eliminating looping in the ring nodes immediately adjacent to the failure and by, additionally, distributing switching of the paths to be protected to ring nodes other than those immediately adjacent to the failure. This is realized by provisioning each node with a map of its traffic pattern (all active tributaries), the identities of all the ring nodes and the relative position of each ring node in the bidirectional multiplex section-switched ring transmission system and allowing the ring node, if it has communications traffic affected by the failure, to bridge and switch directly to and from the protection path.

Technical advantages of this invention are: that misconnections of communications circuits, previously resulting in squelching of the circuits, are eliminated; the resulting restored paths are shorter; and, since only affected communications traffic is bridged and switched, only portions of the protection facility are used, so-called part-time service can be re-established on the protection facility, where applicable.

BRIEF DESCRIPTION OF THE DRAWING In the drawing.

DETAILED DESCRIPTION

Figure 1:
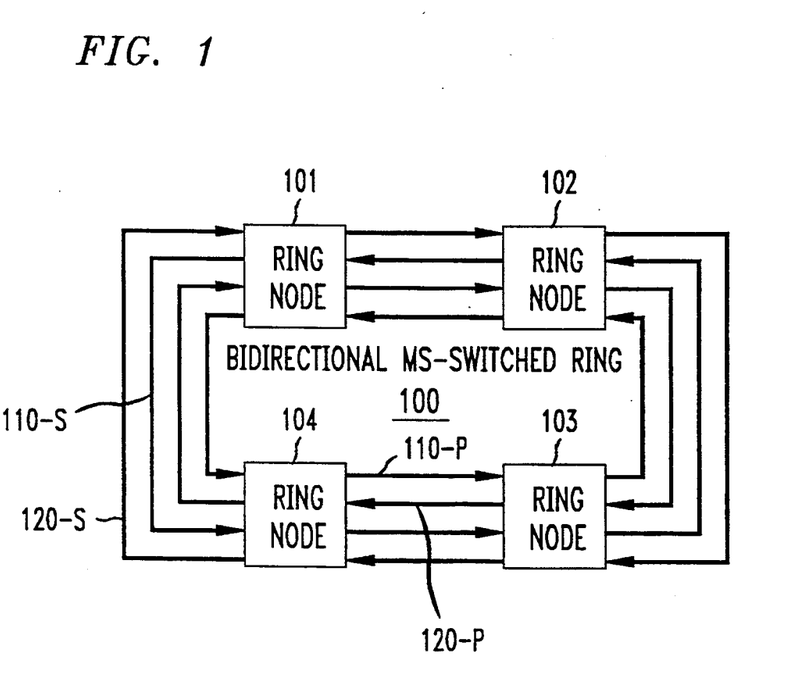
FIG. 1 shows, in simplified block diagram form, bidirectional multiplex section-switched ring transmission system 100 including ring nodes 101 through 104 incorporating the invention.

FIG. 1 shows, in simplified form, bidirectional multiplex section-switched ring transmission system 100, which for brevity and clarity of exposition is shown as including only ring nodes 101 through 104, each incorporating an embodiment of the invention. It will be apparent that additional or fewer ring nodes and different orientation of ring nodes may be employed, as desired. Ring nodes 101 through 104 are interconnected by transmission path 110, including service path 110-S and protection path 110-P, in a counter-clockwise direction, and by transmission path 120, including service path 120-S and protection path 120-P, in a clockwise direction. In this example, transmission paths 110 and 120 are each comprised of two (2) optical fibers. It will be apparent, however, and each of transmission paths 110 and 120 could be comprised of a single optical fiber. That is, bidirectional multiplex section-switched ring transmission system 100 could be either a two (2) optical fiber or a four (4) optical fiber system. In a two (2) optical fiber system, each of the fibers in transmission paths 110 and 120 includes service bandwidth and protection bandwidth. In the four (4) optical fiber system shown, each of transmission paths 110 and 120 includes an optical fiber for service bandwidth and a separate optical fiber for protection bandwidth. Such bidirectional multiplex section-switched ring transmission systems are known. In this example, transmission of digital signals in the CCITT Synchronous Digital Hierarchy (SDH) digital signal format is assumed. However, it will be apparent that the invention is equally applicable to other digital signal formats, for example, the ANSI SONET digital signal format. In this example, it is assumed that an optical STM-N SDH digital signal format is being utilized for transmission over transmission paths 110 and 120. In one example, N=16. Details of the SDH digital signal formats are described in CCITT Recommendations G.707, G.708 and G.709 entitled "Synchronous Digital Hierarchy Bit Rates", "Network Node Interface For The Synchronous Digital Hierarchy" and "Synchronous Multiplex Structure", respectively.

It is noted that requests and acknowledgments for protection switch action are transmitted in an Automatic Protection Switch (APS) channel in the SDH multiplex section overhead accompanying the protection paths 110-P and 120-P on each of transmission paths 110 and 120. The APS channel, in the SDH format, comprises the K1 and K2 bytes in the SDH overhead of each of protection paths 110-P and 120-P. The K1 byte indicates a request of a communications tributary for switch action. The first four (4) bits of the K1 byte indicate the switch request priority and the last four (4) bits indicate the ring node identification (ID) of the destination ring node. The K2 byte indicates an acknowledgment of the requested protection switch action. The first four (4) bits of the K2 byte indicate the ring node ID of the source ring node and the last 4 bits indicate the action taken. For purposes of this description, a "communications circuit" is considered to be a AU-4 SDH digital signal having its entry and exit points on the ring.

Each of ring nodes 101 through 104 comprises an add-drop multiplexer (ADM). Such add-drop multiplexer arrangements are known. For generic requirements of a SDH based ADM see CCITT Recommendation G.782. In this example, the ADM operates in a transmission sense to pass, i.e., express, signals through the ring node, to add signals at the ring node, to drop signals at the ring node, and to bridge and switch signals, in accordance with the principles of the invention, during a protection switch at the ring node. Note that, in accordance with the principles of the invention, there is no looping of the affected signals in ring nodes adjacent the failure, as was required in prior bidirectional multiplex section-switched ring transmission systems.

Figure 2:
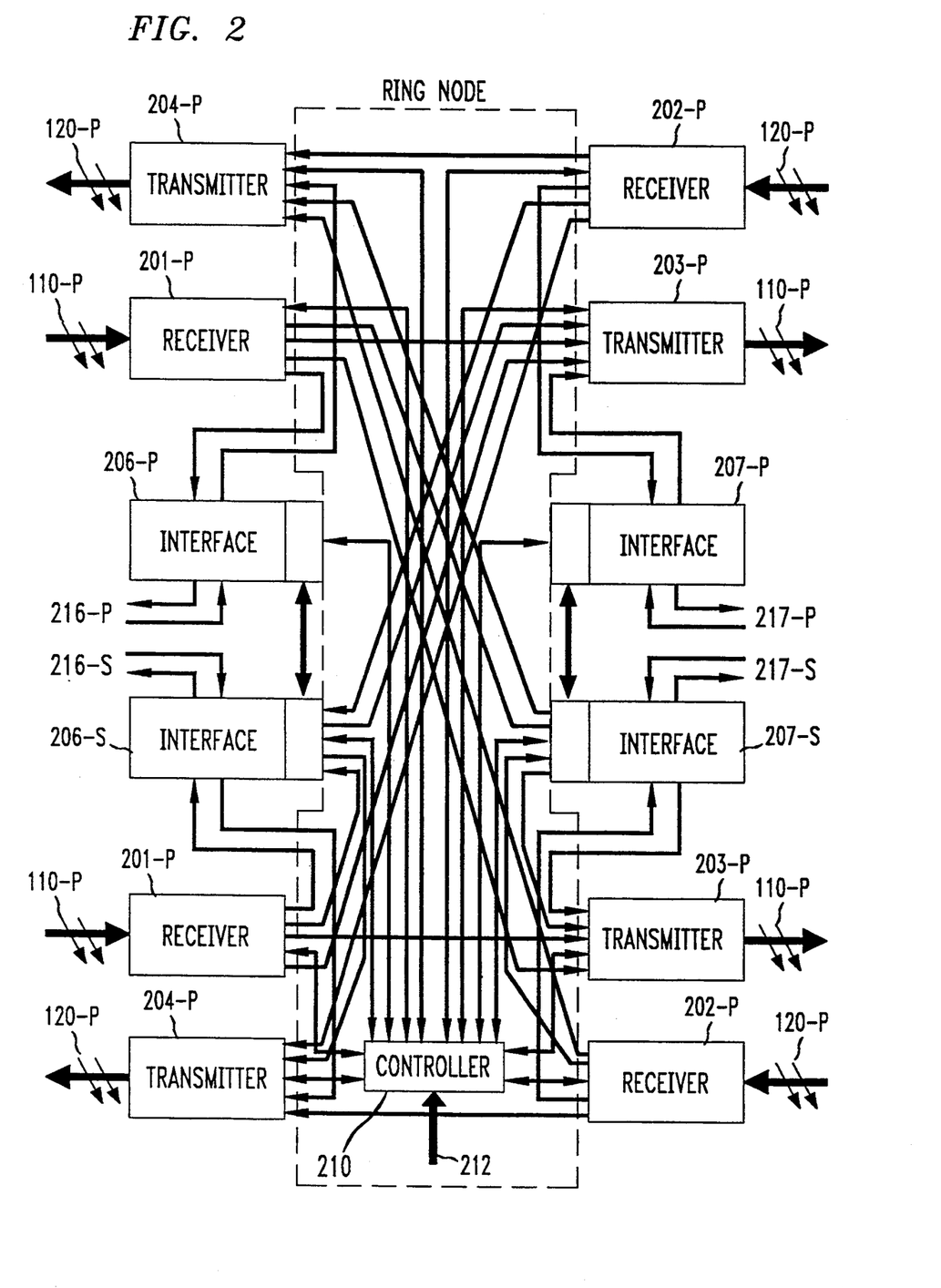
FIG. 2 shows, in simplified block diagram form, details of a ring node including an embodiment of the invention.
Figure 3:
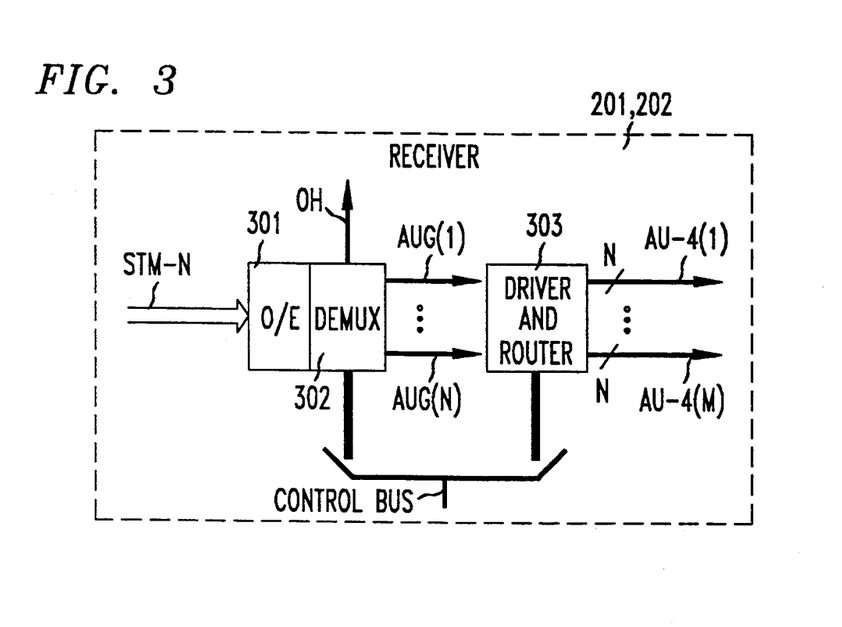
FIG. 3 shows, in simplified block diagram form, details of a receiver used in the ring node of FIG. 2.

FIG. 2 shows, in simplified block diagram form, details of ring nodes 101 through 104, including an embodiment of the invention. In this example, a west (W)-to-east (E) digital signal transmission direction is assumed in the service path 110-S and the protection path 110-P on transmission path 110. It will be apparent that operation of the ring node and the ADM therein would be similar for an east (E)-to-west (W) digital signal transmission direction in the service path 120-S and the protection path 120-P on transmission path 120. Specifically, shown are service path 110-S and protection path 110-P entering the ring node from the west (W) and supplying STM-N SDH optical signals to receiver 201-S and receiver 201-P, respectively, where N is, for example, 16. Similarly, shown are service path 120-S and protection path 120-P entering the ring node from the east (E) and supplying STM-N SDH optical signals to receiver 202-S and receiver 202-P, respectively, where N is, for example, 16. Details of receivers 201 and 202 are identical, and are shown in FIG. 3, to be described below.

Figure 4:
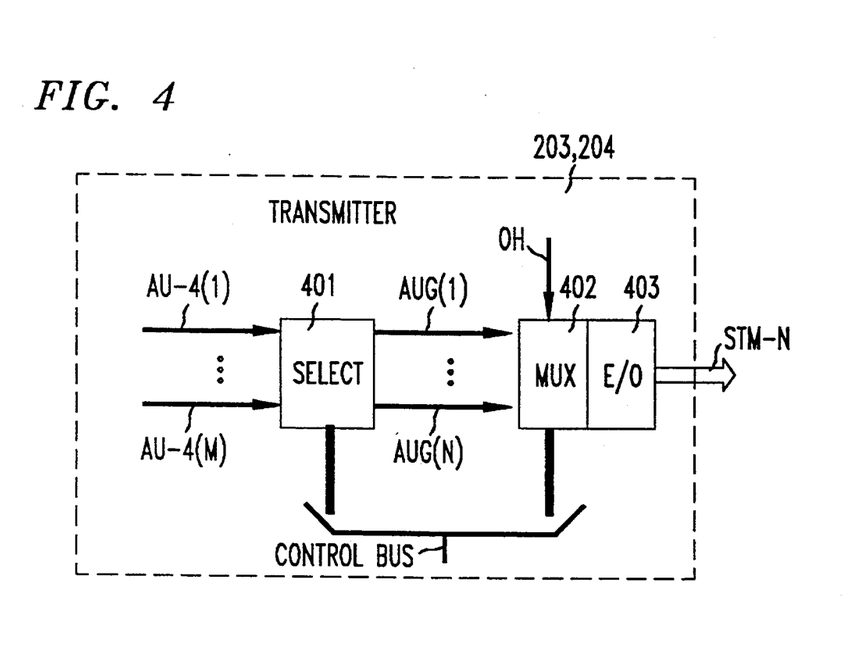
FIG. 4 shows, in simplified block diagram form, details of a transmitter used in the ring node of FIG. 2.

The SDH STM-N optical signals exit the ring node on service path 110-S as an output from transmitter 203-S, on service path 120-S as an output from transmitter 204-S, on protection path 110-P as an output from transmitter 203-P and on protection path 120-P as an output from transmitter 204-P. Details of transmitters 203 and 204 are identical and are shown in FIG. 4, to be described below.

AU-4 SDH output signals from receiver 201-S are routed under control of controller 210 either to transmitter 203-S, i.e., expressed through to service path 110-S, to interface 206-S to be dropped, also to interface 206-S for protection switching to interface 206-P where it will be dropped or to transmitter 203-P to be supplied to protection path 110-P. In similar fashion, AU-4 SDH output signals from receiver 202-S are routed under control of controller 210 either to transmitter 204-S, i.e., expressed through to service path 120-S, to interface 207-S to be dropped, also to interface 206-S for protection switching to interface 206-P where it will be dropped or to transmitter 204-P to be supplied to protection path 120-P. Note that there is no looping back of the AU-4 SDH signals to either protection path 110-P or protection path 120-P, in accordance with the invention. The AU-4 signals from receiver 201-P are supplied either to transmitter 203-P, i.e., expressed through to protection path 110-P, to interface 206-S to be dropped or to transmitter 203-S to be supplied to service path 110-S. In similar fashion, AU-4 signals from receiver 202-P are routed under control of controller 210 either to transmitter 204-P, i.e., expressed through to protection path 120-P, to interface 207-S to be dropped or to transmitter 204-S to be supplied to service path 120-S. Again, note that there is no looping back of the AU-4 SDH signals to either service path 110-S or service path 120-S, in accordance with the invention. AU-4 SDH signals being added and dropped via interface 206-S can be bridged to transmitter 203-P and, hence, protection path 110-P and can be switched from receiver 202-P and, hence, from protection path 120-P, all under control of controller 210. Similarly, AU-4 SDH signals being added and dropped via interface 207-S can be bridged to transmitter 204-P and, hence, protection path 120-P and can be switched from receiver 201-P and, hence, from protection path 110-P, all under control of controller 210.

As indicated above, eliminating the looping of signals in ring nodes adjacent the failure, in accordance with the principles of the invention, minimizes the length of the restored path and, additionally, eliminates communications circuit misconnections which, in turn, eliminates squelching of those circuits.

Interfaces 206-S, 206-P, 207-S and 207-P are employed to interface to particular duplex links 216-S, 216-P, 217-S and 217, respectively, and could include any desired arrangement. For example, interfaces 206 and 207 could include a CEPT-4 digital signal interface to a DSX, a STM-1E (electrical) SDH digital signal interfacing to a DSX, an optical extension interface to an STM-1 SDH optical signal or the like. Such interface arrangements are known. Controller 210 controls the adding and dropping of the signals via interfaces 206 and 207, as well as, the direct bridging and switching of the AU-4 tributaries being added and dropped to and from protection paths 110-P and 120-P. Controller 210 also monitors the status of interfaces 206 and 207 and the digital signals supplied thereto via the control bus arrangement. Specifically, controller 210 monitors interfaces 206 and 207 for loss-of-signal, loss-of-frame, coding violations and the like, i.e., a signal failure condition.

Controller 210 operates to effect the bridging and switching of communications tributaries at ring nodes other than those adjacent the failure, if necessary, in accordance with the principles of the invention. Controller 210 communicates with receivers 201 and 202, transmitters 203 and 204 and interfaces 206 and 207 via a control bus arrangement. Specifically, controller 210 monitors the incoming digital signals to determine loss-of-signal, SDH format K bytes and the like. Additionally, controller 210 causes the insertion of appropriate K byte messages for protection switching purposes, examples of which are described below. To realize the desired bridging and switching of the communications tributaries, controller 210 is advantageously provisioned via bus 212 with the identities (IDs) of of all the communications tributaries passing through the ring node, as well as, those communications tributaries being added and/or dropped at the ring node, the identifies of all the ring nodes in bidirectional multiplex section-switched ring 100 and the positions of the ring nodes in bidirectional multiplex section-switched ring 100. The bridging and switching of communications tributaries under control of controller 210 to effect the invention is described below.

FIG. 3 shows, in simplified form, details of receivers 201 and 202 of FIG. 2. The receiver includes an optical/electrical (O/E) interface 301, demultiplexer (DEMUX) 302 and driver and router 303. An STM-N SDH optical signal is supplied to O/E 301 which converts it to an electrical STM-N signal. In turn, DEMUX 302 demultiplexes the STM-N signal, in known fashion, to obtain up to N AUG SDH signal, namely, AUG (1) through AUG (N). Again, in this example, N=16. The AUG (1) through AUG (N) signals are supplied to driver and router 303 where they are routed under control of controller 210 via the control bus as AU-4 (1) through AU-4 (M) SDH signals. As indicated above, each STM-N signal can include N AUG tributaries, in this example. The AU-4 (1) through AU-4 (M) signals are routed under control of controller 210, as described above regarding FIG. 2. DEMUX 302 also removes STM overhead (OH), and supplies the APS channel K bytes to controller 210 via the control bus.

FIG. 4 shows, in simplified form, details of transmitters 203 and 204 of FIG. 2. The transmitter includes select unit 401, multiplexer (MUX) 402 and electrical/optical interface (E/O) 403. The AU-4 (1) through AU-4 (M) signals are supplied to select unit 401 where the particular tributaries AUG (1) through AUG (N) are selected under control of controller 210 to be supplied to MUX 402. Again, in this example, N=16. The AUG tributaries are supplied to MUX 402 where overhead (OH) is added to yield an electrical STM-N SDH signal. In turn E/O interface 403 converts the STM-N into an optical STM-N for transmission on the corresponding fiber transmission path. MUX 402 also inserts appropriate K byte messages under control of controller 210 via the control bus.

Figure 5:
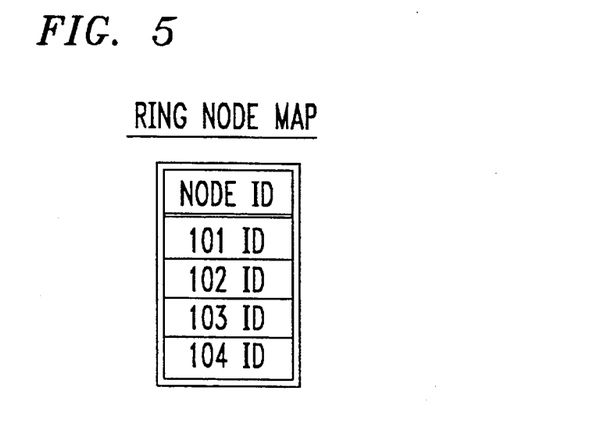
FIG. 5 is an exemplary ring node ID map included in memory of the controller of FIG. 2.

FIG. 5 is a ring node map table including the identification (ID) of and relative location of each of ring nodes 101 through 104 in bidirectional multiplex section-switched ring transmission system 100. The ring node IDs are stored in a look-up table which is provisioned via 212 in memory of controller 210. As indicated above, the ring node IDs are 4 bit words and are included in the second 4 bits of the K1 bytes and the first 4 bits of the K2 bytes in the APS channel.

Figure 6:
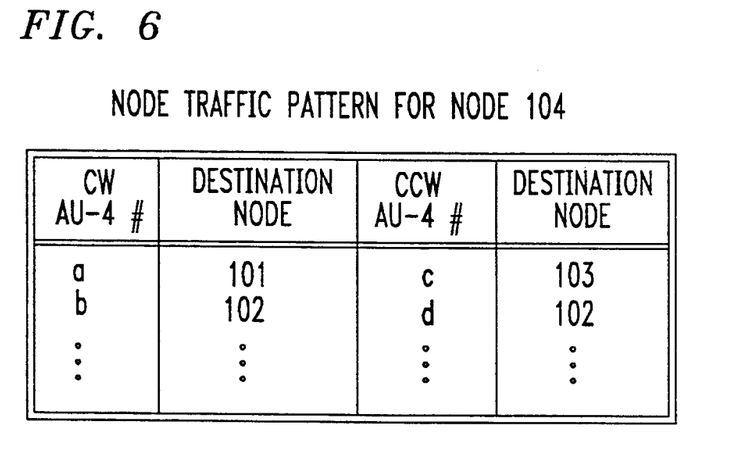
FIG. 6 is an exemplary ring node communications tributary traffic pattern table also included in memory of the controller of FIG. 2 for ring node 104.

FIG. 6 is illustrative of a table including the identification of the ring node communications traffic, i.e., the active communications tributaries, in a ring node, in this example, ring node 104, for the clockwise (CW) direction and the counter-clockwise (CCW) direction of transmission through ring nodes 101 through 104. The active communications tributaries include those being added, dropped or expressed through ring node 104. The table including the IDs of the active communications tributaries in the ring node are provisioned via 212 in a look-up table in memory of controller 210. Shown in the table of FIG. 6 are the AU-4 tributary identifications, i.e., the AU-4 (#). In this example, the number of AU-4 tributaries can be up to 16. Thus shown, are the AU-4 tributaries (a) and (b) being transmitted in ring node 104 in the clockwise (CW) direction and AU-4 tributaries (c) and (d) being transmitted in the counter-clockwise (CCW) direction. The CW destination for AU-4 tributary (a) is ring node 101. The CW destination for AU-4 tributary (b) is ring node 102. The CCW destination for tributary (c) is ring node 103. Finally, the CCW destination for AU-4 tributary (d) is ring node 102.

Figure 7:
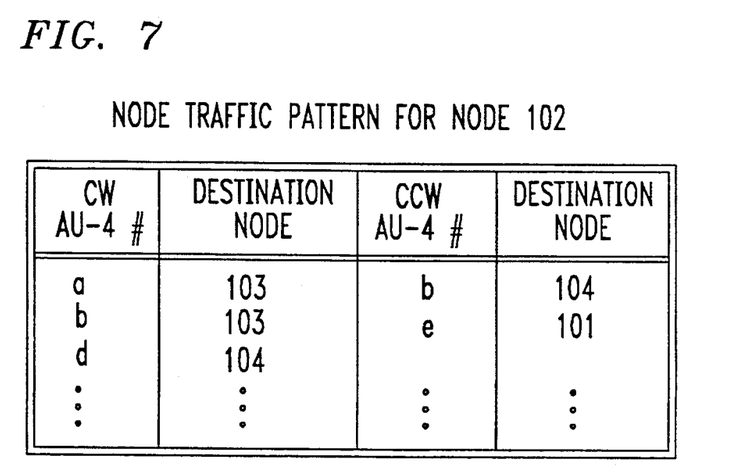
FIG. 7 is an exemplary ring node communications tributary traffic pattern table also included in memory of the controller of FIG. 2 for ring node 102.

FIG. 7 is illustrative of a table including the identification of the ring node communications traffic, i.e., the active communications tributaries, in a ring node, in this example, ring node 102, for the clockwise (CW) direction and the counter-clockwise (CCW) direction of transmission through ring nodes 101 through 104. The active communications tributaries include those being added, dropped or expressed through ring node 102. The table including the IDs of the active communications tributaries in the ring node are provisioned via 212 in a look-up table in memory of controller 210. Shown in the table of FIG. 7 are the AU-4 tributary identifications, i.e., the AU-4 (#). In this example, the number of AU-4 tributaries can be up to 16. Thus shown, are the AU-4 tributaries (a), (b) and (d) being transmitted in ring node 102 in the clockwise (CW) direction and AU-4 tributaries (b) and (e) being transmitted in the counter-clockwise (CCW) direction. The CW destination for AU-4 tributary (a) is ring node 103. The CW destination for AU-4 tributary (b) is ring node 103. The CW destination for tributary (d) is ring node 104. The CCW destination for tributary (b) is ring node 104. Finally, the CCW destination for AU-4 tributary (e) is ring node 101.

Figure 8:
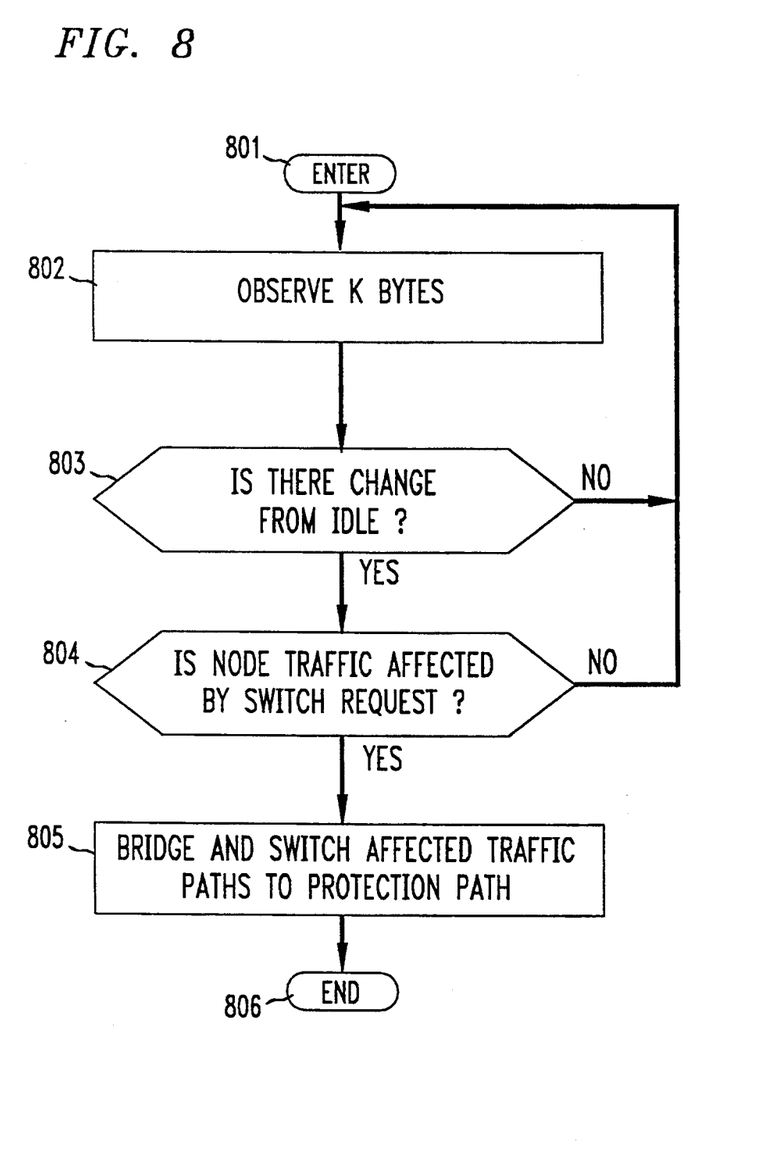
FIG. 8 is a flow chart illustrating the bridge and switch operation of the controller of FIG. 2.

FIG. 8 is a flow chart illustrating the operation of controller 210 in controlling the operation of the ring nodes in order to effect the bridging and switching of tributary traffic paths in the presence of a failure, in accordance with the invention. It should be noted that all so-called part-time service being transported on the protection path is preempted upon detection of the failure. Specifically, the process is entered via step 801. Then, operational block 802 causes the K bytes of an incoming STM-N signal to be observed. Then, conditional branch point 803 tests to determine if the observed K bytes indicate a change from an idle state. If no change from the idle state is indicated control is returned to step 802. If the observed K bytes indicate switch request messages have been received, conditional branch point 804 tests to determine if communications traffic for this ring node is affected by the switch request. If the test result is NO, control is returned to step 802. If the test result in step 804 is YES, operational block 805 directly bridges and switches the affected tributary traffic paths from and to the appropriate protection path. Thereafter, the process is ended in step 806.

Figure 9:
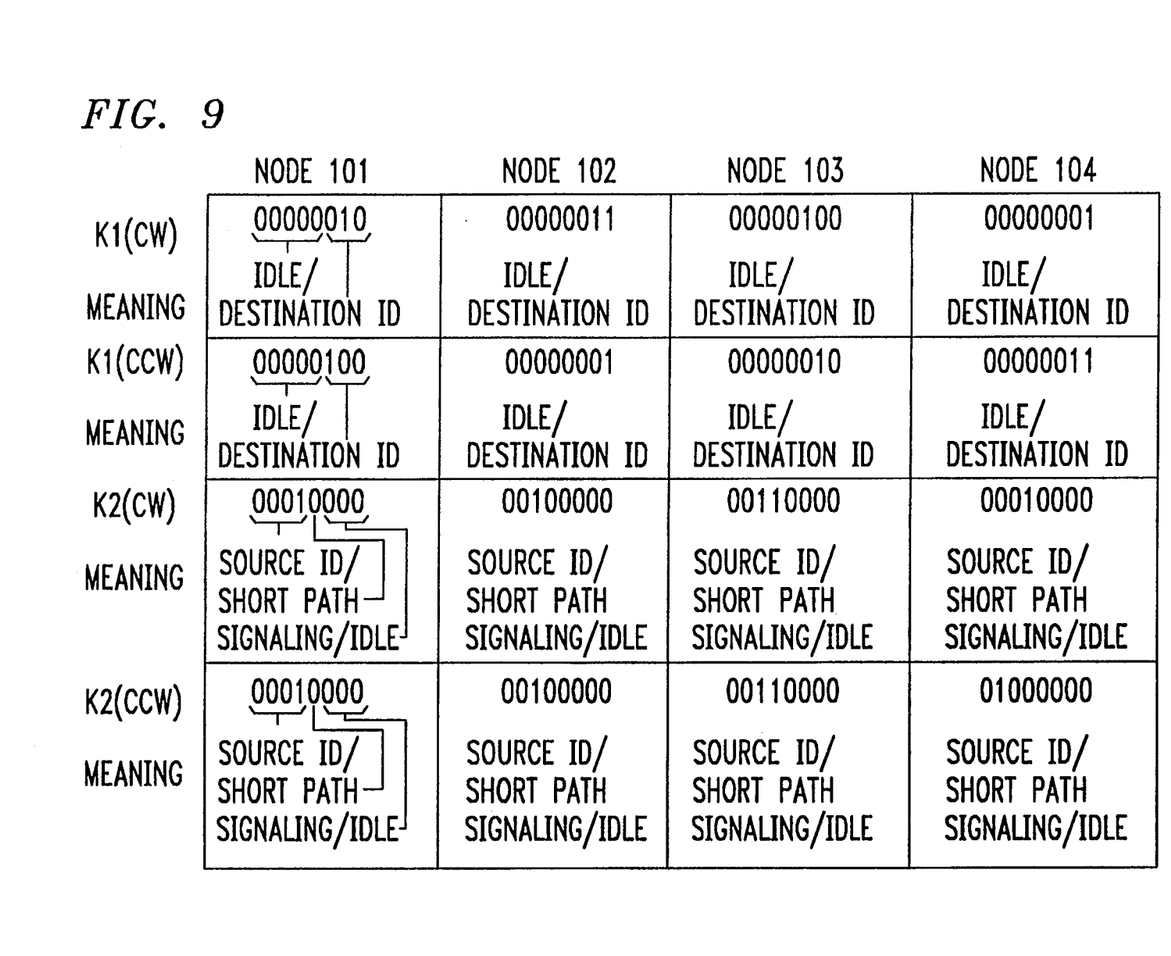
FIG. 9 is a table illustrating the switch request message (K1) and switch acknowledgement message (K2) transmission for ring nodes 101 through 104 for an idle condition of the bidirectional multiplex section-switched ring transmission system 100.

FIG. 9 is a table illustrating the switch request message (K1) and switch acknowledgement message (K2) transmission for ring nodes 101 through 104 for an idle condition of the bidirectional multiplex section-switched ring transmission system 100. As indicated above, the K1 byte transports any switch request messages in the APS of the appropriate protection path. The K2 byte transports acknowledgement messages. In the idle state, i.e., no switch being requested, the K1 byte includes an idle code in the first four (4) and the destination ID in the second four (4) bits. The K2 byte includes the source ID in the first four (4) bits, short path code bit in the fifth (5) bit and signaling/idle code in the last three (3) bits. Note that the K1 and K2 bytes for each of service paths 110-S and 120-S are transmitted in the APS channel of protection paths 120-P and 110-P, respectively. The particular K1 and K2 byte idle state messages for nodes 101 through 104 employed in bidirectional multiplex section-switched ring transmission system 100 are shown in FIG. 9.

Figure 10:
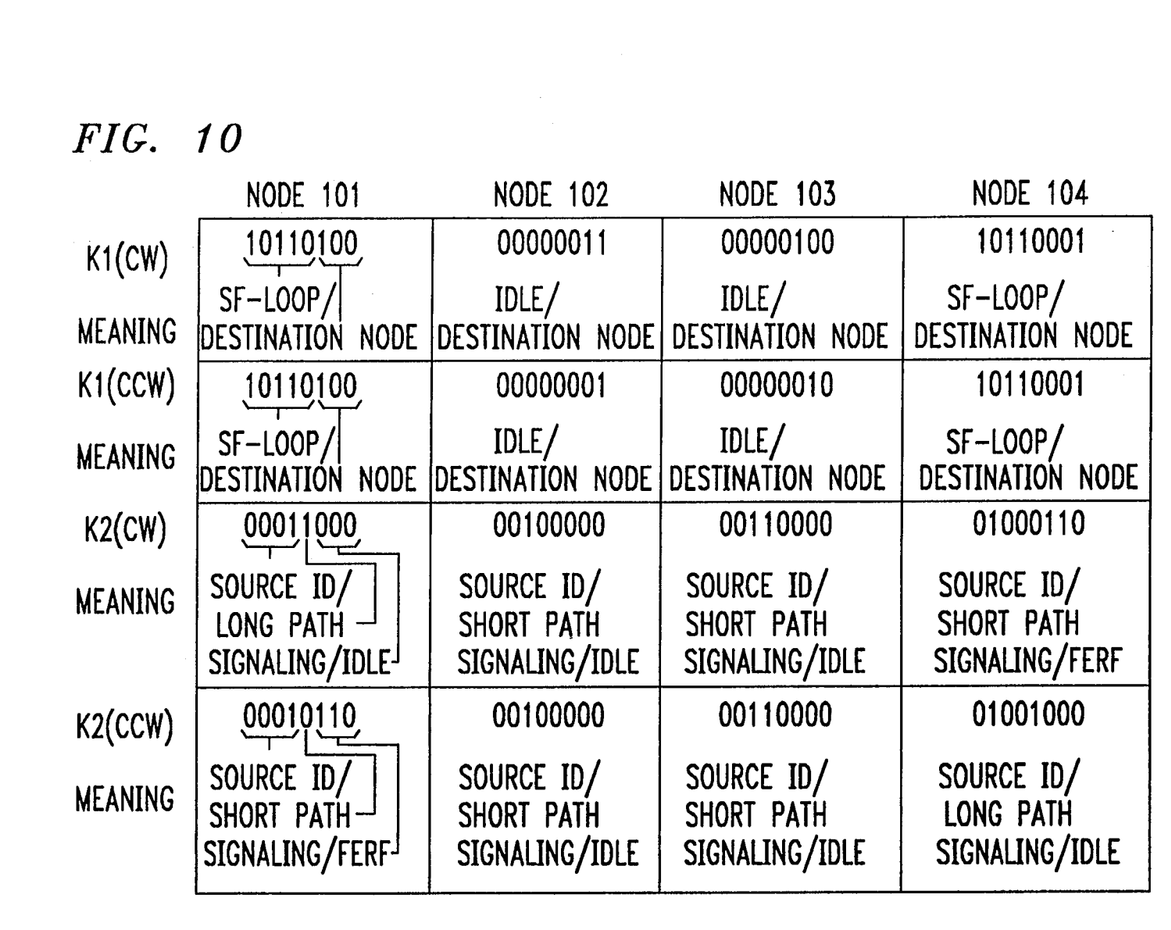
FIG. 10 is a table illustrating the initial switch request message (K1) and switch acknowledgement message (K2) transmission for ring nodes 101 through 104 for a complete fiber cut fault between ring nodes 101 and 104 bidirectional multiplex section-switched ring transmission system 100.

FIG. 10 is a table illustrating the initial switch request message (K1) and switch acknowledgement message (K2) transmission for ring nodes 101 through 104 for a complete fiber cut fault between ring nodes 101 and 104 bidirectional multiplex section-switched ring transmission system 100. Thus, ring nodes 101 and 104 insert switch request messages in the K1 bytes in both protection paths 110-P and 120-P. The switch request message indicates a signal failure and the destination ring node. Additionally, an acknowledgement message is inserted in the K2 bytes of both protection path 110-P and 120-P. The acknowledgement message inserted in path 110-P includes the source 1D, long path bit and signaling/idle. The acknowledgement message inserted in path 120-P includes the source ID, short path bit and signaling-/FERF (far end received failure). Ring node 104 inserts similar switch request and acknowledgement messages in the K1 and K2 bytes of paths 11 0-P and 120-P, except the acknowledgement message inserted in path 110-P indicates short path and signaling/FERF and the acknowledgement message inserted in path 120-P indicates long path and signaling/idle. Again, note that the K1 and K2 bytes for each of service paths 110-S and 120-S are transmitted in the APS channel of protection paths 120-P and 110-P, respectively. The particular K1 and K2 byte messages for nodes 101 through 104 employed in bidirectional multiplex section-switched ring transmission system 100 upon initiating a switch are shown in FIG. 10.

Figure 11:
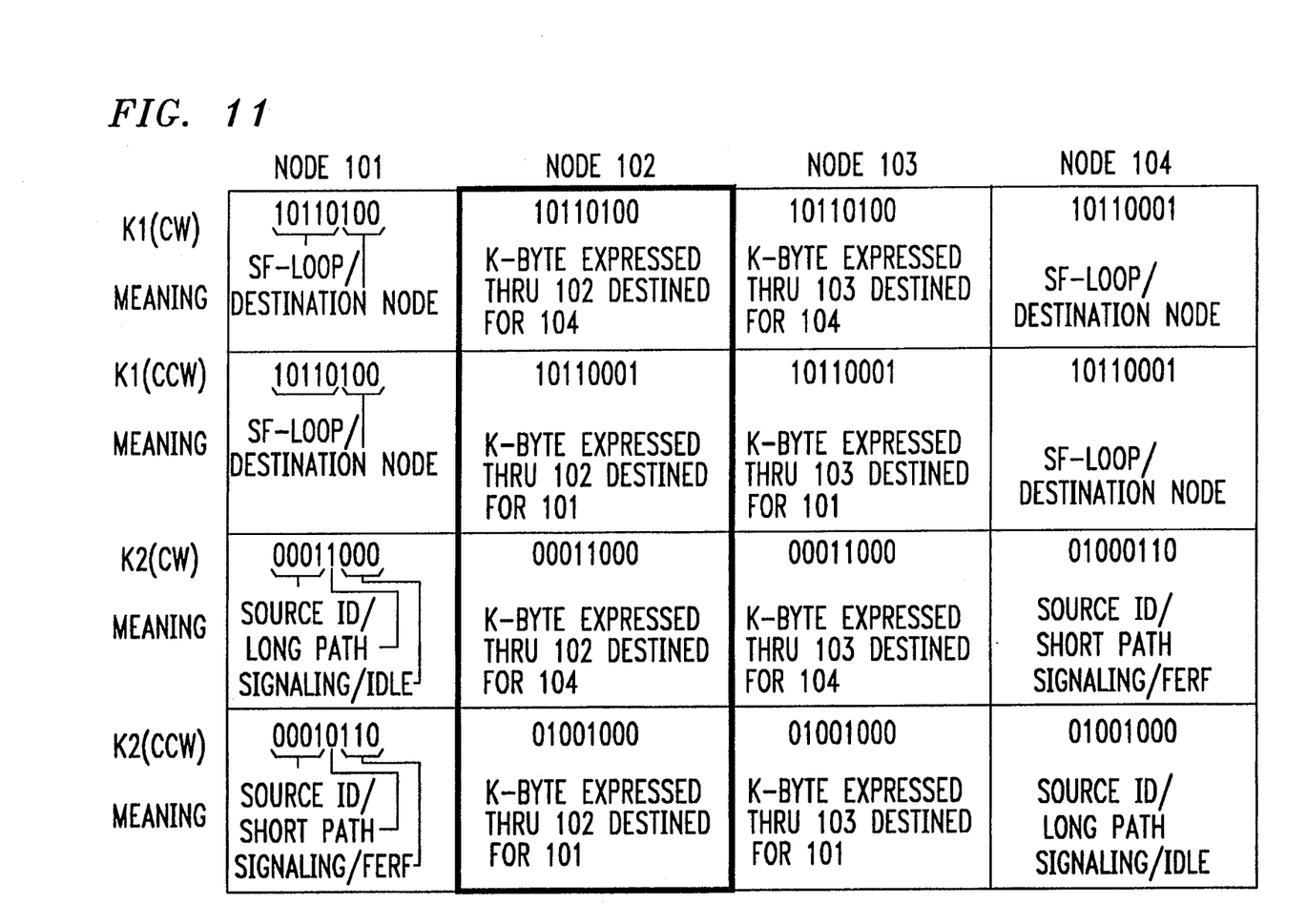
FIG. 11 is a table illustrating the switch request message (K1) and switch acknowledgement message (K2) transmission resulting in the communication tributary traffic pattern in bidirectional multiplex section-switched ring transmission system 100 shown in FIG. 12 by employing the invention.
Figure 12:
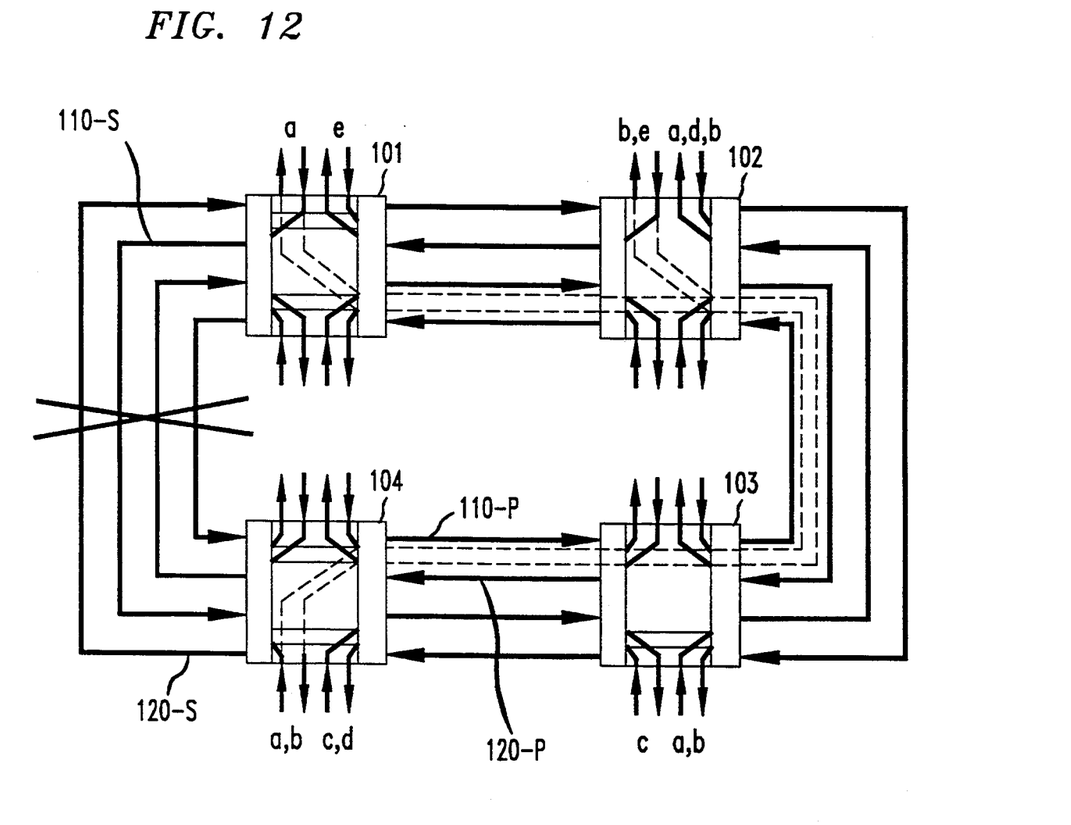
FIG. 12 shows, in simplified block diagram form, the communications tributary traffic pattern resulting in bidirectional multiplex section-switched ring transmission system 100 by employing the principles of the invention for a fault between ring nodes 101 and 104.

FIG. 11 is a table illustrating the switch request message (K1) and switch acknowledgement message (K2) transmission resulting in the communications tributary traffic pattern in bidirectional multiplex section-switched ring transmission system 100 shown in FIG. 12 by employing the invention. Again, ring nodes 101 and 104 insert switch request messages in the K1 bytes in both protection paths 110-P and 120-P. The switch request message indicates a signal failure and the destination ring node. Thus, ring node 101 inserts a switch request message in the K1 byte of the APS in the clockwise (CW) direction in protection path 120-P and in the counter-clockwise (CCW) direction in protection path 110-P. The switch request message indicates a signal failure and identifies ring node 104 as the destination ring node. The K1 byte on protection path 120-P is expressed through ring nodes 102 and 103 and arrives at ring node 104. Since ring node 104 has detected loss-of-signal and the switch request messages includes its identification, it knows that the fault is in the path between ring nodes 101 and 104. Similarly, ring node 104 inserts a switch request message in the K1 byte of the APS in the clockwise (CW) direction in protection path 120-P and in the counter-clockwise (CCW) direction in protection path 110-P. The K1 byte on protection path 110-P is expressed through ring nodes 103 and 102 and arrives at ring node 101. Since ring node 101 has detected loss-of-signal and the switch request messages includes its identification it knows that the fault is in the path between ring nodes 101 and 104. Both of ring nodes 101 and 104 insert acknowledgement messages in the APS K2 byte both protection paths 110-P and 120-P. Again, the K2 acknowledgement message from ring node 101 is expressed through ring nodes 102 and 103 to ring node 104, while the K2 acknowledgement message from ring node 104 is expressed through ring nodes 103 and 102 to ring node 101.

Because of the provisioning of each ring node, in accordance with the invention, each of the ring nodes by observing the K byte messages knows if any communications tributary that is terminated in the ring node is affected by the failure. If so, the ring node will bridge and switch the affected tributary to and from the appropriate protection path, in accordance with the invention.

FIG. 12 shows, in simplified block diagram form, the resulting AU-4 tributary traffic pattern in bidirectional multiplex section-switched ring transmission system 100 by employing the principles of the invention for a fault between ring nodes 101 and 104 for the provisioning as shown in FIGS. 5, 6 and 7. It is noted that all so-called part-time communications traffic being transported on the protection paths 110-P and 120-P must be removed before any protection switching activity. Thus, in ring node 101, STM-1 tributary (a) intended for ring node 104 in the counter-clockwise (CCW) direction is directly bridged and switched to and from protection paths 110-P and 120-P, while STM-1 tributary (e) intended for ring node 102 in the clockwise (CW) direction is unaffected. In ring node 102, STM-1 tributary (b) intended for ring node 104 in the counter-clockwise direction is directly bridged and switched to and from protection paths 110-P and 120-P, while STM-1 tributaries (e) intended for ring node 101 in the CCW direction, (a) and (b) intended for ring node 103 and (d) intended for ring node 104 in the CW direction are unaffected. In ring node 103, STM-1 tributaries (a), (b), and (c) are unaffected. In ring node 104, STM-1 tributaries (a) and (b) intended for ring node 101 and 102, respectively, in the CW direction are directly bridged and switched to and from protection paths 110-P and 120-P, while STM-1 tributaries (c) and (d) intended for ring nodes 103 and 104, respectively, in the CCW direction are unaffected. As indicated above, since the affected STM-1 tributaries are directly bridged and switched to and from the protection paths at its termination ring nodes, which are not necessarily adjacent the failure, looping is eliminated, in accordance with the invention. Additionally, the elimination of looping now frees up portions of the protection paths and so-called part-time communications traffic can be transported over those freed up portions of the protections paths.

The above-described arrangements are, of course, merely illustrative of the application of the principles of the invention. Other arrangements may be devised by those skilled in the art without departing from the spirit or scope of the invention.

We claim:

1. A bidirectional multiplex section-switched ring transmission system including:

a plurality of ring nodes;

a first transmission path including a service path and a protection path interconnecting said plurality of ring nodes and transporting communications signals around the ring transmission system from ring node to ring node in a first direction of transmission;

a second transmission path including a service path and a protection path interconnecting said plurality of ring nodes and transporting communications circuits around the ring transmission system from ring node to ring node in a second direction of transmission opposite the first direction of transmission;

each of said plurality of ring nodes comprising:

means for storing entries identifying communications tributaries active in the ring node and for storing entries identifying all the ring nodes and their relative positions in the bidirectional multiplex section-switched ring transmission system;

means for monitoring protection switch messages incoming to the ring node to determine whether any changes in the protection switch messages have occurred indicating that one or more failures exist in a transmission path between this ring node and any other ring node in the bidirectional multiplex section-switched ring transmission system;

means responsive to any changes in said protection switch messages for determining which of said active communications tributaries in the ring node are affected by the failure in a transmission path; and means for directly bridging and switching to and from, respectively, said protection paths said affected communications tributaries having a termination in this ring node, which ring node is not necessarily adjacent the failure in a transmission path and wherein the shortest direct restoration path is attained between ring nodes and loop-back switching of communications tributaries in any ring node is eliminated.

2. The invention as defined in claim 1 wherein said communications tributaries are AU-4 synchronous digital hierarchy tributaries.

3. The invention as defined in claim 1 wherein said means for directly switching and bridging switches and bridges said affected communications tributaries so that they are transported on the protection paths in a direction in the bidirectional multiplex section-switched ring to avoid interruption of the paths by a transmission path failure.

4. The invention as defined in claim 3 wherein the entries stored in said means for storing include the identities of communication tributaries to be expressed through the ring node, communication tributaries to be added at the ring node and communication tributaries to be dropped at the ring node.

5. The invention as defined in claim 4 wherein said means for monitoring includes means for observing K bytes of synchronous digital hierarchy STM-N signals incoming to the ring node to determine if a change from an idle state has occurred which thereby indicates that a path failure exists and said means for determining includes means for observing switch request messages in said K bytes for determining if any of the tributaries active in the ring node are affected by the failure.

6. In a bidirectional multiplex section-switched ring transmission system including:

a plurality of ring nodes;

a first transmission path including a service path and a protection path interconnecting said plurality of ring nodes and transporting communications circuits around the ring transmission system from ring node to ring node in a first direction of transmission; and a second transmission path including a service path and a protection path interconnecting said plurality of ring nodes and transporting communications circuits around the ring transmission system from ring node to ring node in a second direction of transmission opposite the first direction of transmission;

a method of redirecting communications signals comprising the steps of:

storing in each of said plurality of ring nodes entries identifying communications tributaries active in the ring node and for storing entries identifying all the ring nodes and their relative positions in the bidirectional multiplex section-switched ring transmission system;

monitoring protection switch messages incoming to the ring node to determine whether any changes in the protection switch messages have occurred indicating that one or more failures exist in a transmission path between this ring node and any other ring node in the bidirectional multiplex section-switched ring transmission system;

in response to any changes in said protection switch messages, determining which of said active communications tributaries in the ring node are affected by the failure; and in response to said determination that communications tributaries active in the ring node are affected by the failure, directly bridging and switching to and from, respectively, said protection paths the affected tributaries having a termination in the ring node, which ring node is not necessarily adjacent the failure and wherein the shortest direct restoration path is attained between ring nodes and loop-back switching of the affected communications tributaries is eliminated.

7. The invention as defined in claim 6 wherein said communications tributaries are AU-4 synchronous digital hierarchy tributaries.

8. The invention as defined in claim 6 wherein said steps of directly switching and bridging switches and bridges said affected communications tributaries so that they are transported on the protection paths in a direction in the bidirectional multiplex section-switched ring to avoid interruption of the paths by a transmission path failure.

9. The invention as defined in claim 8 wherein the entries being stored include the identities of communication tributaries to be expressed through the ring node, communication tributaries to be added at the ring node and communication tributaries to be dropped at the ring node.

10. The invention as defined in claim 9 wherein said step of monitoring includes observing K bytes of synchronous digital hierarchy STM-N signals incoming to the ring node to determine if a change from an idle state has occurred which thereby indicates that a path failure exists and said step of determining includes observing switch request messages in said K bytes for determining if any of the tributaries active in the ring node are affected by the failure.

* * * * *